(12) United States Patent
Larson et al.

(10) Patent No.: US 12,259,591 B2
(45) Date of Patent: Mar. 25, 2025

(54) DUAL-SIDED FIBER ROUTING TRAYS, ASSEMBLIES, AND METHODS

(71) Applicant: CORNING RESEARCH & DEVELOPMENT CORPORATION, Corning, NY (US)

(72) Inventors: Donald Kent Larson, Cedar Park, TX (US); Jameson Rensloe Wright, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 233 days.

(21) Appl. No.: 17/984,737

(22) Filed: Nov. 10, 2022

(65) Prior Publication Data
US 2023/0168456 A1 Jun. 1, 2023

Related U.S. Application Data (60) Provisional application No. 63/284,109, filed on Nov. 30, 2021.

(51) Int. Cl.
G02B 6/44 (2006.01)

(52) U.S. Cl.
CPC ......... *G02B 6/4454* (2013.01); *G02B 6/4477* (2013.01)

(58) Field of Classification Search
CPC .................................................. G02B 6/4477
See application file for complete search history.

(56) References Cited

U.S. PATENT DOCUMENTS

| 7,751,674 B2 | 7/2010 | Hill |
| 8,903,216 B2 | 12/2014 | Thompson et al. |
| 10,114,187 B2 | 10/2018 | Allen |
| 2004/0123998 A1 | 7/2004 | Berglund et al. |
| 2005/0167147 A1 | 8/2005 | Marsac et al. |

(Continued)

FOREIGN PATENT DOCUMENTS

| EP | 1711989 B1 | 5/2008 |
| WO | 2005/076426 A1 | 8/2005 |
| WO | 2005/076427 A1 | 8/2005 |

OTHER PUBLICATIONS

European Patent Application No. 22210137.0, Extended European Search Report dated Mar. 20, 2023; 5 pages; European Patent Office.

*Primary Examiner* — Chad H Smith (74) *Attorney, Agent, or Firm* — Tamika A. Crawl-Bey (57) ABSTRACT

A dual-sided fiber routing tray includes a body, a connector interface, and one or more strain relief assemblies. The body defines a connector side and a slack storage side opposite the connector side. The connector interface is arranged on the connector side of the body between the first end and the second end and is configured to connect one or more fibers. The one or more strain relief assemblies are configured to secure one or more strength members of a fiber optic cable to the body. The one or more strain relief assemblies extend through the body and engage the connector side and the slack storage side of the body. The one or more strain relief assemblies are configured to engage the one or more strength members of the fiber optic cable in the engaged position thereby restricting motion of the one or more strength members relative to the body.

3 Claims, 5 Drawing Sheets

(56) References Cited

U.S. PATENT DOCUMENTS

| | | | |
|---|---|---|---|
| 2007/0154159 A1* | 7/2007 | Kowalczyk | G02B 6/4442 |
| | | | 385/135 |
| 2014/0119705 A1 | 5/2014 | Fabrykowski et al. | |
| 2015/0253528 A1 | 9/2015 | Corbille et al. | |
| 2017/0329096 A1 | 11/2017 | Allen | |
| 2019/0018212 A1 | 1/2019 | Allen | |
| 2021/0011239 A1* | 1/2021 | Geens | G02B 6/44465 |

* cited by examiner

DUAL-SIDED FIBER ROUTING TRAYS, ASSEMBLIES, AND METHODS

CROSS-REFERENCE TO RELATED APPLICATION

This Application Claims Priority to U.S. Provisional Application No. 63/284,109, filed Nov. 30, 2021, the entirety of which is incorporated herein by reference.

BACKGROUND

The present specification generally relates to fiber routing trays, assemblies and methods and, more specifically, dual-sided fiber routing trays, assemblies, and methods.

Fiber optic cables are widely used for telecommunications applications where high information capacity, noise immunity and other advantages of optical fibers may be desirable. Fiber cable architectures are emerging for connecting homes and/or business establishments, via optical fibers, to a central location, for example. A trunk or main cable (also referred to herein as an "express fiber cable") may be routed, for example, through a housing subdivision, business district, etc., and small fiber count "drop cables" may be spliced to the main cable at predetermined spaced apart locations to allow connectivity.

A typical main cable may be installed underground and have multiple drop cables connected thereto. Each of the drop cables, in turn, may be routed to an optical network unit (ONU), which may serve one or more locations (e.g., homes, business, etc.) or directly to one or more locations (e.g., homes, businesses, etc.).

Drop cable installation may occur at a fiber drop access point. The fiber drop access point may generally include a vault located underground in which spliced connections between the main cable and drop fiber cables is made within a fiber enclosure. A fiber enclosure may alternatively enclose a coupled connection between two like cables, such as a latch connector ("LC") or subscriber connector ("SC") connection. These connections can be damaged if the cables are pulled or otherwise strained. Accordingly, it may be desirable for fiber enclosures to have associated cable retention devices to prevent unwanted strain on the cable. Moreover, structures to make routing and/or splicing connections more intuitive/convenient may also be desirable.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In a first aspect A1, a dual-sided fiber routing tray includes a body, a connector interface, and one or more strain relief assemblies. The body extends between a first end and a second end. The body defines a connector side and a slack storage side opposite the connector side. The connector interface is arranged on the connector side of the body between the first end and the second end and is configured to connect one or more fibers. The one or more strain relief assemblies are coupled to the body and are configured to secure one or more strength members of a fiber optic cable to the body. The one or more strain relief assemblies extend through the body and engage the connector side and the slack storage side of the body. The one or more strain relief assemblies are movable between an engaged position and a released position, and the one or more strain relief assemblies are configured to engage the one or more strength members of the fiber optic cable in the engaged position thereby restricting motion of the one or more strength members relative to the body.

In a second aspect A2 according to the first aspect A1, the slack storage side is configured to store a length of the one or more fibers. In a third aspect A3 according to any preceding aspect A1-A2, the one or more strain relief assemblies comprise teeth operable to grip the one or more strength members. In a fourth aspect A4 according to any preceding aspect A1-A3, the one or more strain relief assemblies comprise a screw, wherein advancing the screw increases a retention force on the one or more strength members. In a fifth aspect A5 according to any preceding aspect A1-A4, the one or more strain relief assemblies are configured to retain a plurality of types of strength members. In a sixth aspect A6 according to any preceding aspect A1-A5, the dual-sided fiber routing tray further includes a strain relief tab and an attachment mechanism, wherein the fiber optic cable is coupled to the strain relief tab via the attachment mechanism. In a seventh aspect A7 according to any preceding aspect A1-A6, the slack storage side comprises at least one retention tab configured to secure the one or more fibers against the slack storage side. In an eighth aspect A8 according to the seventh aspect A7, the at least one retention tab is configured to secure the one or more fibers in a FIG. 8 arrangement against the slack storage side. In a nineth aspect A9 according to any preceding aspect A1-A8, the connector interface comprises an SC coupler. In a tenth aspect A10 according to any of the first through eight aspects A1-A8, the connector interface is configured to secure a splice connection. In an eleventh aspect A11, according to any of the first through eight aspects A1-A8, the connector interface comprises a modular connector interface configured to receive a plurality of types of connector inserts.

In a twelfth aspect A12, a fiber routing assembly includes an enclosure and a dual-sided fiber routing tray. The dual-sided fiber routing tray includes a body, a connector interface, and one or more strain relief assemblies. The body extends between a first end and a second end. The body defines a connector side and a slack storage side opposite the connector side. The connector interface is arranged on the connector side of the body between the first end and the second end and is configured to connect one or more fibers. The one or more strain relief assemblies are coupled to the body and are configured to secure one or more strength members of a fiber optic cable to the body. The one or more strain relief assemblies extend through the body and engage the connector side and the slack storage side of the body. The one or more strain relief assemblies are movable between an engaged position and a released position, and the one or more strain relief assemblies are configured to engage the one or more strength members of the fiber optic cable in the engaged position thereby restricting motion of the one or more strength members relative to the body.

In a thirteenth aspect A13 according to the twelfth aspect A12, the enclosure is sealed with a gel sealing. In a fourteenth aspect A14 according to any of the twelfth through thirteenth aspects A12-A13, the dual-sided fiber routing tray further includes a strain relief tab and an attachment mechanism, wherein the fiber optic cable is coupled to the strain relief tab via the attachment mechanism. In a fifteenth aspect A15 according to any of the twelfth through fourteenth aspects A12-A14, the one or more strain relief assemblies are configured to retain a plurality of types of strength members. In a sixteenth aspect A16 according to any of the twelfth through fifteenth aspects A12-A15, the slack storage side includes at least one retention tab configured to secure the one or more fibers against the slack storage side. In a seventeenth aspect A17 according to any of the twelfth through sixteenth aspects A12-A16, the connector interface comprises a modular connector interface configured to receive a plurality of types of connector inserts.

In an eighteenth aspect A18, a method of assembling a fiber optic connector includes securing a fiber optic cable against a connector side of a dual-sided connector tray at a strain relief tab of the connector side, retaining a first fiber of the fiber optic cable against a slack storage side of the dual-sided connector tray, wherein the slack storage side is opposite the connector side; and connecting the first fiber to a second fiber at a connector interface arranged on the connector side.

In a nineteenth aspect A19 according to the eighteenth aspect A18, the securing the first fiber of the fiber optic cable against the slack storage side further includes arranging the first fiber in a FIG. 8 orientation. In a twentieth aspect A20 according to either the eighteenth aspect A18 or nineteenth aspect A19, the method further includes securing a strength member of the fiber optic cable within a strain relief assembly.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
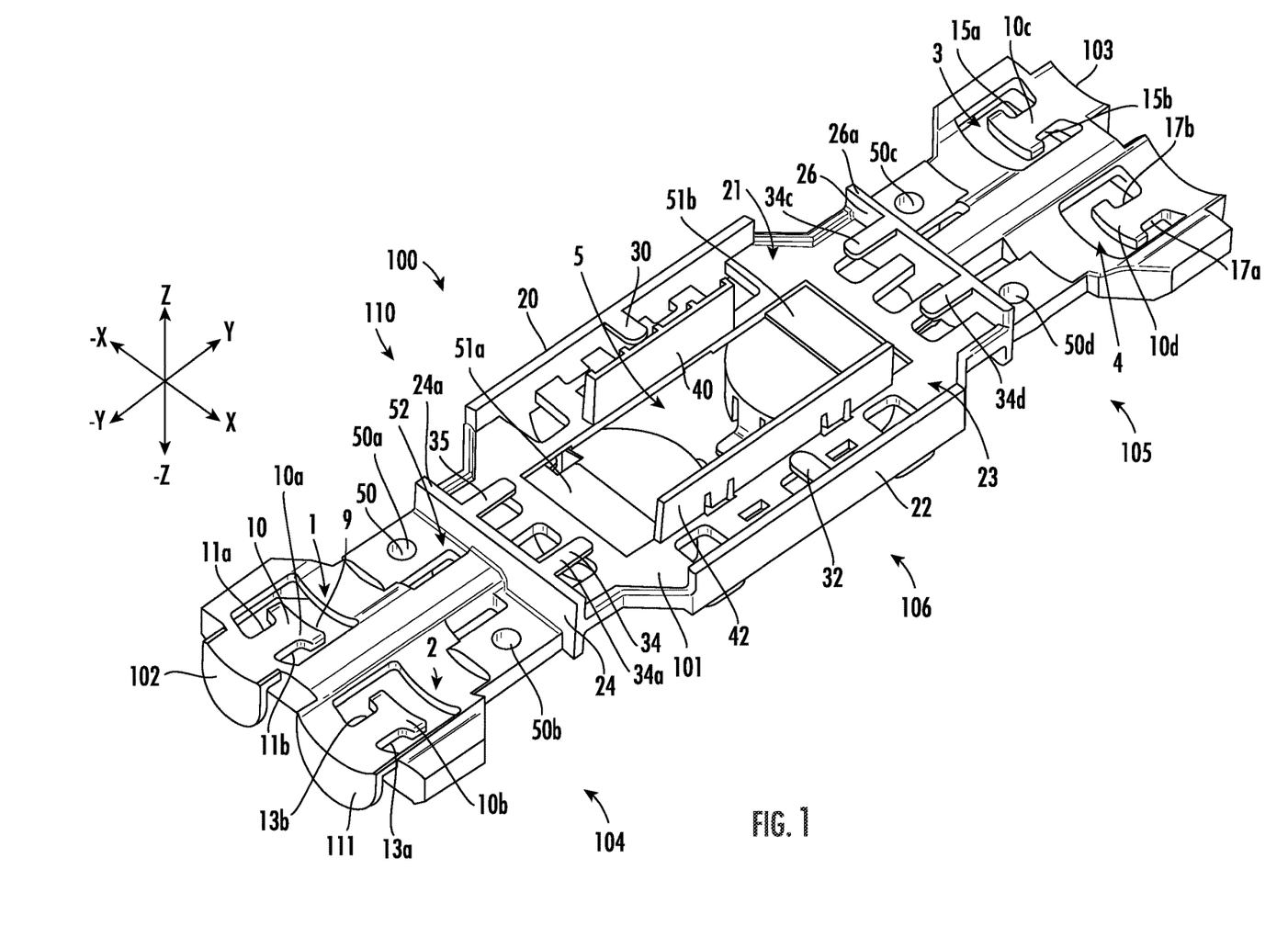
FIG. 1 schematically depicts a top perspective view of a fiber routing tray according to one or more embodiments shown and described herein.
Figure 2:
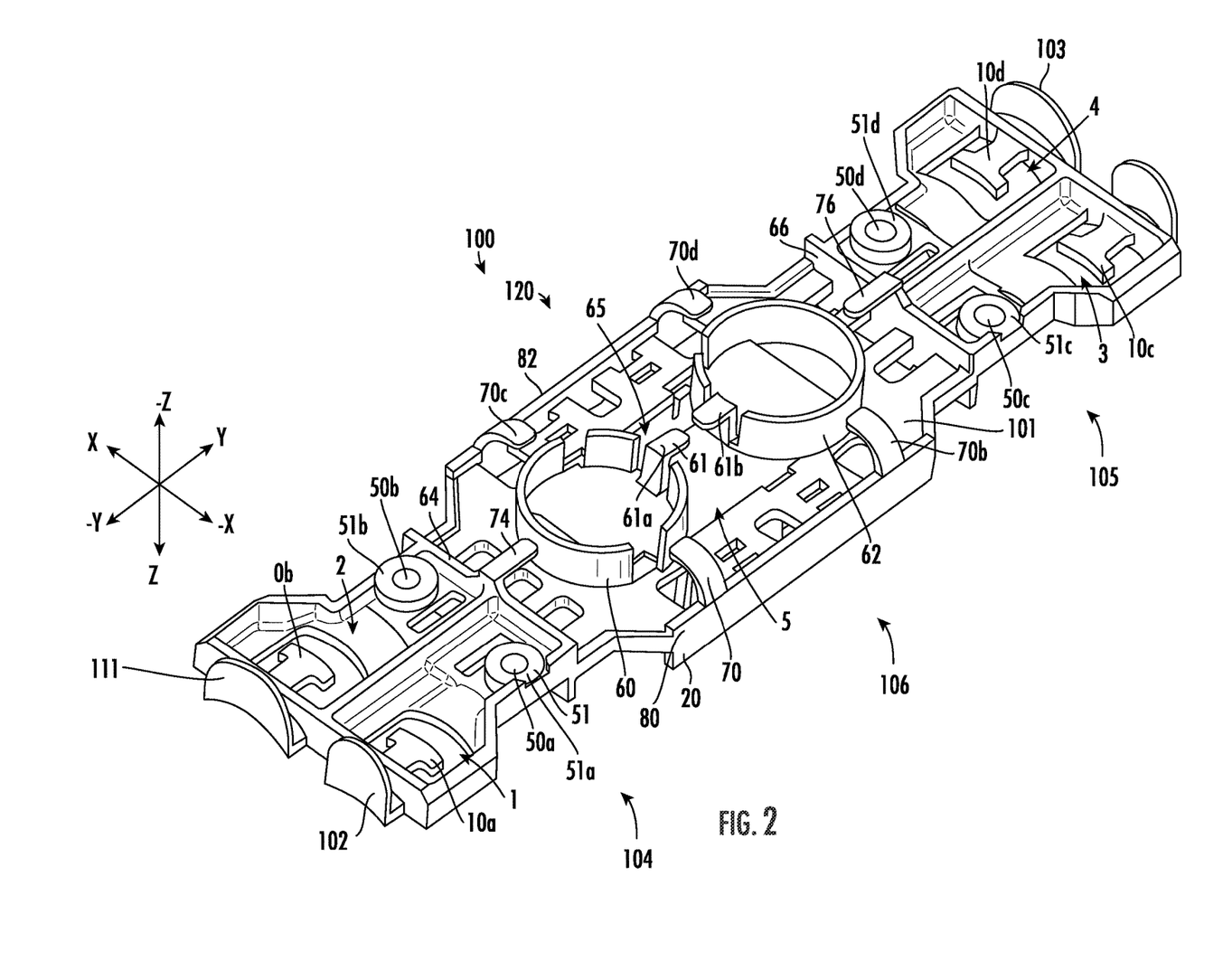
FIG. 2 schematically depicts a bottom perspective view of the fiber routing tray of FIG. 1, according to one or more embodiments shown and described herein.

Reference will now be made in detail to various embodiments of fiber routing trays, assemblies, and methods, examples of which are illustrated in the accompanying drawings. Whenever possible, the same reference numerals will be used throughout the drawings to refer to the same or like parts. FIGS. 1 and 2 schematically depict a fiber routing tray. The fiber routing tray generally includes a body, a connector interface, and one or more strain relief assemblies. The body extends between a first end and a second end and defines a connector side and a slack storage side opposite the connector side. The connector interface may be arranged on the connector side of the body between the first end and the second end and is configured to connect one or more fibers. The one or more strain relief assemblies are coupled to the body and are configured to secure one or more strength members of a fiber optic cable to the body. The one or more strain relief assemblies may extend through the body and engage the connector side and the slack storage side of the body. As will be described in greater detail herein, the one or more strain relief assemblies may be movable between an engaged position and a released position, wherein the one or more strain relief assemblies are configured to engage the one or more strength members of the fiber optic cable in the engaged position thereby restricting motion of the strength member relative to the body. Accordingly, by restricting motion of the strength member relative to the body, axial tension may be concentrated on the strength member as opposed to the more delicate fibers. These and additional features and benefits will be described in greater detail herein.

Directional terms as used herein—for example up, down, right, left, front, back, top, bottom—are made only with reference to the figures as drawn and are not intended to imply absolute orientation unless otherwise specified. As used herein, "inward" is used directionally to refer to the direction away from a perimeter of the fiber routing tray. Correspondingly, as used herein, "outward" is used directionally to refer to the direction toward the perimeter of the fiber routing tray.

As used herein, the term "fiber enclosure" refers to an enclosure for storage and containment of connections between cables. For example, while the present specification is generally described in terms of fiber optic connections, fiber enclosures according to the present disclosure may include enclosures for electrical and/or other types of connections. In some embodiments, the fiber enclosure may hold spliced connections and/or connectorized connections between express fiber cables and drop fiber cables, though other uses are contemplated and possible.

As used herein, the term "express fiber cable" refers to the main or trunk fiber optic cable which may be routed between various fiber drop access points to which drops cables are spliced to allow signal transportation from the express fiber cable to the drop fiber cable.

As used herein, the term "drop fiber cables" or "drop cables," are fiber optic cables including one or more optical fibers, which are spliced to one or more optical fibers of the express fiber cable and provide communication to buildings, signal splitters, or the like. Accordingly, drop fiber cables generally include a lower number of fibers as compared to the express fiber cable.

Unless otherwise expressly stated, it is in no way intended that any method set forth herein be construed as requiring that its steps be performed in a specific order, nor that with any apparatus specific orientations are required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring collectively to FIGS. 1-2, an embodiment of a fiber routing tray 100 is schematically depicted. The fiber routing tray 100 generally includes a body 101 extending between a first end 102 and a second end 103, the first end 102 may define a first attachment region 104, and the second end 103 may define a second attachment region 105 opposite the first attachment region 104. The body 101 may further define a connector region 106 extending longitudinally (e.g., along the +/− Y direction of the depicted coordinate axes) between the first attachment region 104 and the second attachment region 105. As depicted, the body 101 may have an elongated shape such that it is longer in a longitudinal direction (such as along the +/− Y direction of the depicted coordinate axes) extending between the first end 102 and the second end 103 and narrower in a lateral direction (such as along the +/− X direction of the depicted coordinate axes) that is perpendicular to the longitudinal direction. However, other geometries are contemplated and possible. As will be described in greater detail herein, the body 101 further defines a connector side 110 and a slack storage side 120 opposite the connector side 110.

Referring to FIG. 1, a top view of the fiber routing tray 100 is generally depicted displaying the connector side 110 of the fiber routing tray 100. As seen from this perspective, the fiber routing tray 100 may include one or more strain relief tabs 10, such as four strain relief tabs 10a, 10b, 10c, and 10d; though more or fewer strain relief tabs are contemplated and possible. For example, strain relief tabs 10a and 10b may be positioned near the first end 102 within the first attachment region 104 of the fiber routing tray 100, and strain relief tabs 10c and 10d may be positioned near the second end 103 within the second attachment region 105 of the fiber routing tray 100. The one or more strain relief tabs 10 may be formed in the body 101 of the fiber routing tray 100 so as to be integral (e.g., such as molded, injection molded, etc.) therewith, or separately coupled thereto via any desired coupling means (e.g., adhesives, fasteners, etc.). The one or more strain relief tabs 10 may generally extend along a plane parallel to and/or within of the body (e.g., in the +/−Y direction of the depicted coordinate axes) and may be used to support cables (not shown) entering or exiting the fiber routing tray 100.

As noted above, the one or more strain relief tabs 10 may be configured to support a cable (not shown). For example, the one or more strain relief tabs 10 may be shaped to support a cable on the connector side 110 and/or the slack storage side 120. For example, the one or more strain relief tabs 10 may be concave for supporting a cable, such that the cable nests within the strain relief tab to which is it engaged. Referring specifically to the strain relief tab 10a as an example, the strain relief tab 10a may be concave toward the connector side 110. In this way, the strain relief tab 10a may mate better with a rounded cable.

The body 101 may define an attachment window surrounding a free end 9 of each strain relief tab of the one or more strain relief tabs 10. For example, the one or more strain relief tabs 10 may be cantilevered over a respective attachment window 1, 2, 3, 4. The attachment windows 1, 2, 3, 4 may extend through the body from the connector side 110 to the slack storage side 120.

In embodiments, the one or more strain relief tabs 10 are shaped to receive an attachment mechanism (e.g., a zip-tie, string, tape, wire, or other appropriate attachment device). For example, the one or more strain relief tabs may define an outer recess 11a and an inner recess 11b to provide a substantially T-shaped strain relief tab. In this way and as will be described in greater detail herein, the strain relief tab 10 may be surrounded by the attachment mechanism (not shown) about the outer recess 11a and inner recess 11b. It is noted that though a T-shaped strain relief tab is depicted, other shapes (e.g., L-shaped, pin-shaped, Y-shaped, etc.) are contemplated and possible without departing from the scope of the present disclosure.

Figure 3:
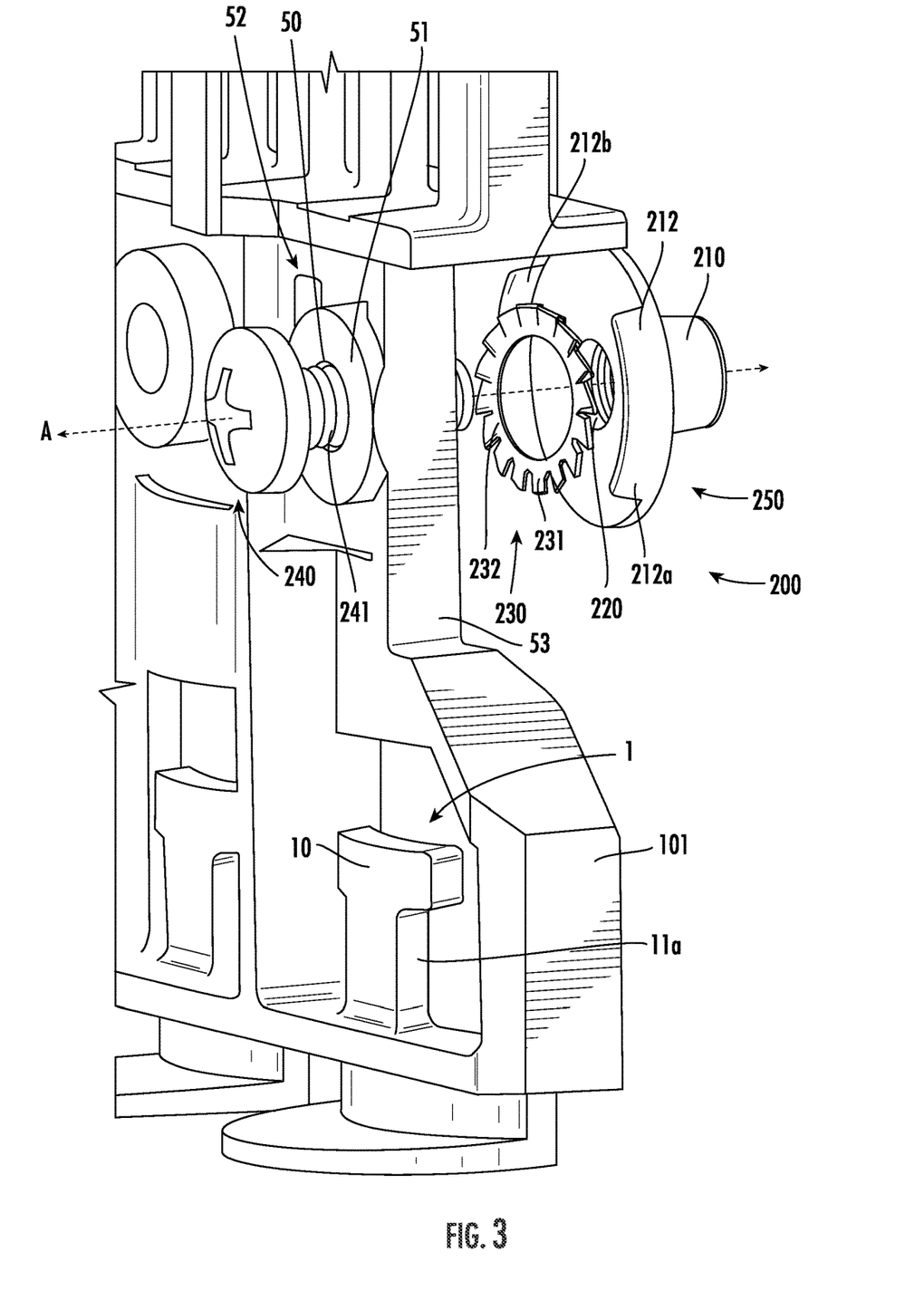
FIG. 3 schematically depicts a perspective view of an exploded assembly of a retention device of the fiber routing tray of FIG. 1, according to one or more embodiments shown and described herein.

Positioned longitudinally inward of each of the one or more strain relief tabs 10, the body 101 may define one or more through-holes 50 (such as 50a, 50b, 50c, and 50d), as depicted. The one or more through-holes 50 may extend from the connector side 110 to the slack storage side 120. As will be described in greater detail herein, the one or more through-holes 50 may each be configured to receive a strain relief assembly 200, such as depicted in FIG. 3.

Still referring to FIG. 1 and as noted above, the connector portion 106 may be positioned longitudinally between the first attachment portion 104 and the second attachment portion 105. The connector portion 106 may be delineated from the first attachment portion 104 by a first dividing wall 24. The first dividing wall 24 may be raised on the body 101 (e.g., in the +Z direction of the depicted coordinate axes). As depicted, the first dividing wall 24 may extend across an entire lateral width of the body 101. However, in other embodiments, the first dividing wall 24 may not extend across the entire width but only a portion thereof. Extending from the first dividing wall 24 may be one or more dividing wall tabs 34 such as dividing wall tabs 34a and 34b. The one or more dividing wall tabs 34 may extend longitudinally inward from first dividing wall 24 such that they are oriented away from the first attachment portion 104, though other configurations are contemplated and possible. The one or more dividing wall tabs 34 may be cantilevered from a top surface 24a of the first dividing wall 24 such that one or more cables or fibers (not pictured) may be retained beneath. In embodiments, there may be more than one dividing wall tab, such as two more, three or more, four or more, etc.

Similarly, the connector portion 106 may be delineated from the second attachment portion 105 by a second dividing wall 26. The second dividing wall 26 may be raised on the body 101 (e.g., in the +Z direction of the depicted coordinate axes). The second dividing wall 26 may also have one or more dividing wall tabs 34 such as dividing wall tabs 34c and 34d. The one or more dividing wall tabs 34 may extend longitudinally inward from the second dividing wall 26 such that they are oriented away from the second attachment portion 105, though other configurations are contemplated and possible. As described above, the one or more dividing wall tabs 34 may be cantilevered from a top surface 26a of the second dividing wall 26 such that one or more cables or fibers (not pictured) may be retained beneath. In embodiments, there may be more than one dividing wall tab, such as two more, three or more, four or more, etc.

Disposed between the first dividing wall 24 and the second dividing wall 26, the connector portion 106 may define a connector interface 5. As depicted, the connector interface 5 may extend through the body 101 from the connector side 110 to the slack storage side 120. The connector interface 5 may be configured to receive a connection insert such as an SC insert, LC insert, splicing insert, and the like, as will be described in greater detail herein. In particular, the connector interface 5 may be a modular insert port configured to receive a plurality of such connection inserts. The connector interface 5 may include recessed portions 51a and 51b that are recessed into the body 101. In this way, a connector insert with a corresponding geometry may sit within the recessed portions 51a, 51b. The connector may be held in place via adhesive, snap-fit connection, or any other suitable connection. In other embodiments, such an insert may not be distinctly included and instead may be integrally formed with the body 101 at a connector interface 5.

Abutting the connector interface 5 on opposite longitudinal sides of the connector interface 5 may be a first interior wall 40 and a second interior wall 42. As will be described herein, the first interior wall 40 and the second interior wall 42 may be positioned to orient one or more cables or fibers (not pictured) about the connector side 110 of the body 101. Each of the first interior wall 40 and the second interior wall 42 may be raised on the body 101 (e.g., in the +Z direction of the depicted coordinate axes) and may extend in the longitudinal direction (e.g. in the +/−Y direction of the depicted coordinate axes). As shown, the first interior wall 40 may longer than the second interior wall 42. However, in some embodiments, the second interior wall 42 may be longer or the same length as the first interior wall 40.

The body 101 may further include a first exterior wall 20 disposed outside of the first interior wall 40 in the −X direction of the depicted coordinate axes. The first exterior wall 20 may be substantially parallel to the first interior wall 40. As depicted, the first exterior wall 20 and the first interior wall 40 may define a first fiber channel 21 disposed therebetween. The first exterior wall 20 may include one or more fiber channel tabs 30. As depicted, the one or more fiber channel tabs 30 may extend laterally inward (in the +X direction of the depicted coordinate axes) from the first exterior wall 20 so that the one or more fiber channel tabs 30 are cantilevered from the first exterior wall 20 over the first fiber channel 21. Alternatively, in other embodiments, the one or more fiber channel tabs 30 may extend laterally outward from the first interior wall 40 so that they are positioned over the first fiber channel 21.

Similarly, the body 101 may include a second exterior wall 22 disposed outside of the second interior wall 42 in the +X direction of the depicted coordinate axes. The second exterior wall 22 may be substantially parallel to the second interior wall 42. As depicted, the second exterior wall 22 and the second interior wall 42 may define a second fiber channel 23 disposed therebetween. The second exterior wall 22 may include one or more fiber channel tabs 32. As depicted, the one or more fiber channel tabs 32 may extend laterally inward (in the −X direction of the depicted coordinate axes) from the second exterior wall 22 so that the one or more fiber channel tabs 32 are cantilevered from the second exterior wall 22 over the second fiber channel 23. Alternatively, in other embodiments, the one or more fiber channel tabs 32 may extend laterally outward from the second interior wall 42 so that they are positioned over the second fiber channel 23.

Referring now to FIG. 2, the slack storage side 120 of body 101 is schematically depicted. On the slack storage side 120, the body 101 may include one or more bosses 51, such as bosses 51a, 51b, 51c, and 51d, disposed in the first attachment portion 104 and the second attachment portion 105. The one or more bosses 51 may surround the one or more through-holes 50 as shown. As will be described in greater detail herein, the one or more through-holes 50 may receive a strain relief assembly 200, such as depicted in FIG. 3. Accordingly, the one or more bosses 51 may be raised on the body 101 (e.g. in the −Z direction of the depicted coordinate axes) and may increase material strength of the body 101 at the one or more through-holes 50.

The connector portion 106 may be delineated from the first attachment portion 104 on the slack storage side 120 by a first lateral wall 64. The first lateral wall 64 may be raised on the body 101 (e.g. in the −Z direction of the depicted coordinate axes) and may extend in the lateral direction (e.g. in the +/−X direction of the depicted coordinate axes). The first lateral wall 64 may include one or more lateral wall retention tabs 74. The one or more lateral wall retention tabs 74 may extend longitudinally inward (e.g. in the +Y direction of the depicted coordinate axes) from the first lateral wall 64. The one or more lateral wall retention tabs 74 may be cantilevered from the first lateral wall 64 such that one or more cables or fibers (not pictured) may be retained beneath the one or more lateral wall retention tabs 74.

Similarly, the connector portion 106 may be delineated from the second attachment portion 105 on the slack storage side 120 by a second lateral wall 66. The second lateral wall 66 may be raised on the body 101 (e.g. in the −Z direction of the depicted coordinate axes) and may extend in the lateral direction (e.g. in the +/−X direction of the depicted coordinate axes). The second lateral wall 66 may include one or more lateral wall retention tabs 76. The one or more lateral wall retention tabs 76 may extend longitudinally inward (e.g. in the −Y direction of the depicted coordinate axes) from the second lateral wall 66. The one or more lateral wall retention tabs 76 may be cantilevered from the second lateral wall 66 such that one or more cables or fibers (not pictured) may be retained beneath the one or more lateral wall retention tabs 76.

The body 101 may further include longitudinal walls 80 and 82, disposed within the connector portion 106 on the slack storage side 120. The longitudinal walls 80 and 82 may be raised on the body 101 (e.g. in the −Z direction of the depicted coordinate axes) and may extend in the longitudinal direction (e.g. in the +/− Y direction of the depicted coordinate axes). The longitudinal walls 80 and 82 may include one or more longitudinal wall retention tabs 70, such as longitudinal wall retention tabs 70a, 70b, 70c, and 70d. The longitudinal wall retention tabs 70a and 70b may extend laterally inward from the longitudinal wall 80 (e.g. in the +X direction of the depicted coordinate axis). Similarly, the longitudinal wall retention tabs 70c and 70 d may extend laterally inward from the longitudinal wall 82 (e.g. in the −X direction of the depicted coordinate axes). The one or more longitudinal wall retention tabs 70 may be cantilevered from the longitudinal walls 80 and 82 such that cables or fibers (not pictured) may be retained beneath the one or more longitudinal wall retention tabs 70. As depicted, the one or more longitudinal wall retention tabs 70 may be curved; however, in other embodiments the longitudinal wall retention tabs may be differently shaped, such as substantially straight.

Disposed within the connector portion 106, the body 101 may include two slack winding walls 60 and 62, though other configurations are contemplated and possible. The slack winding walls 60 and 62 may be positioned between the longitudinal walls 80 and 82 and may be longitudinally aligned relative to each other (e.g. along the +/− Y direction of the depicted coordinate axes). The slack winding walls 60 and 62 may be spaced apart in the longitudinal direction such that they border and/or overlap with the connector interface 5 at opposite sides. As depicted, the slack winding walls 60 and 62 may be substantially circular in shape; however, other shapes are contemplated and possible. The slack winding walls 60 and 62 may each include one or more slack retention tabs 61 such as slack retention tabs 61a and 61b. The slack retention tabs 61a and 61b may extend longitudinally inward from the slack winding walls 60 and 62, respectively, such that they are disposed above the connector interface 5. In particular, the slack retention tab 61a may be cantilevered from the slack winding wall 60 in the +Y direction of the depicted coordinate axes. Similarly, the slack retention tab 61b may be cantilevered from the slack winding wall 62 in the −Y direction of the depicted coordinate axes. As will be described in greater detail herein, one or more cable or fibers (not pictured) may be wrapped about the slack winding walls 60 and 62 and may be retained beneath the slack retention tabs 61a and 61b. It is noted that the slack winding walls 60 and 62 may be continuous and/or may have interruptions or voids 65 formed therein. Such voids 65 may provide improved manufacturability, while reducing material costs. Moreover, in embodiments one or more of the voids may be positioned adjacent the slack retention tabs 61a, 61b such that the slack retention tabs 61a, 61b have increased flexibility.

As will be appreciated by those skilled in the art, the one or more slack retention tabs 60, the one or more lateral wall retention tabs 74 and 76, the one or more longitudinal wall retention tabs 70, the one or more fiber channel tabs 30 and 32, and the one or more dividing wall tabs 34 may be referred to collectively as "retention tabs" or each individually as a "retention tab."

It is noted that, the body 101 may be made from a variety of materials. In particular, the body 101 may be made from a thermoplastic, such as acrylonitrile styrene acrylate, acrylonitrile butadiene styrene, and the like. Alternatively, the body 101 may be formed from a stereolithography resin or other thermoset polymer. The body 101 and its features may be molded, injection molded, machined, 3D printed, etc. In some embodiments, one of more the features may be coupled together to form the body such as via adhesives, fasteners, welding, brazing, etc.

Referring now to FIG. 3, an exploded assembly of a strain relief assembly 200 is schematically depicted. The strain relief assembly 200 may be assembled to the one or more of the through-holes 50. The strain relief assembly 200 may generally include a screw 240 and a threaded cap 250, though a greater or fewer number of components are contemplated without departing from the scope of the present disclosure.

The screw 240 may include external threads 241. The external threads 241 may be narrower in diameter than the through-hole 50 such that the external threads 241 may pass through the through-hole 50 when assembled. The external threads 241 may be longer in length than a width of the body 101 at the through-hole 50 in the +/−Z direction of the depicted coordinate axes. Accordingly, the external threads 241 may extend past the connector side 110 of the body 101 when assembled from the slack storage side 120 through the connector side 110.

The threaded cap 250 may have an elongated portion 210 and may have internal threads 220 extending through at least a part of the elongated portion 210. The internal threads 220 may be appropriately sized to mate with the external threads 241 of the screw 240. The threaded cap 250 may further include one or more standoffs 212 located opposite the elongated portion 210, such as standoffs 212a and 212b. The standoffs 212a and 212b may be circumferentially spaced about an axis A of the threaded cap 250. It is noted that while two standoffs are depicted a greater or fewer number of standoffs are contemplated and possible. In embodiments, the body 101 may define one or more standoff recesses 52 disposed near the one or more bosses 51. The one or more standoff recesses 52 may be configured to receive the one or more standoffs 212, such as standoff 212b, as shown. In this way, the standoff recess 52 may receive the standoff 212b, thereby preventing rotation of the threaded cap 250. As depicted, the standoff 212a may not engage with a standoff recess. Instead, the standoff 212a may engage with the sidewall 53. It is noted that while one standoff recess is depicted, a greater or few number of standoff recesses are contemplated and possible. For example, in embodiments, a second standoff recess corresponding to standoff 212a may be included. In other embodiments, no standoff recesses may be included.

Disposed between the body 101 and the threaded cap 250, the stain relief assembly 200 may further include a toothed washer 230. The toothed washer 230 may have an inner diameter opening 232. The inner diameter opening 232 may be larger than the external threads 241 of the screw 240 such that the external threads 241 may pass through the inner diameter opening 232 when assembled. The toothed washer 230 may further include teeth 231 arranged on an outer diameter 234 of the toothed washer 230. The teeth 231 may be radially spaced about the axis A. The teeth 231 may be oriented relative to the body 101 such that the teeth 231 may engage with a component, such as a strength member, disposed between the toothed washer 230 and the body 101. The teeth 231 may be configured to retain a plurality of types of strength members such as aramid yarn, fiberglass epoxy rods, steel, or other suitable material. For example, if the strength member is aramid yarn (though other strength members are contemplated and possible), the teeth 231 may grip the aramid yarn and secure it in place between the toothed washer 230 and the body 101.

As noted above, the strain relief assembly 200 may be assembled to the body 101 and is configured to relieve some strain within a cable, which may be applied to the body 101 through a strength member of the cable. Assembling the strain relief assembly 200 to the body 101 may include extending the screw 240 through the through-hole 50 such that the external threads 241 extend through to the connector side 110 of the body 101. Assembly may further include positioning the toothed washer 230 about the external threads 241 on the connector side 110 of the body 101. Assembly may further include positioning the threaded cap 250 about the toothed washer 230. As shown, the toothed washer 230 may therefore be disposed between the standoffs 212a and 212b of the threaded cap 250. Assembly may further include advancing the external threads 241 of the screw 240 into the internal threads 220 of the threaded cap 250 to secure that screw 240 to the threaded cap 250, thereby securing the strain relief assembly to the body 101. By securing the screw 240 to the threaded to the threaded cap 250 the one or more standoffs 212 may be drawn into the one or more standoff recesses 252 that the threaded cap 250 is restricted from rotating about the axis A. For example, the first standoff 212a may be positioned within the standoff recess 252 and the second standoff may engage a sidewall 53 of the body 101, thereby preventing rotation of the threated cap 250 relative to the body 101. Such engagement may aid in maintaining alignment and attachment of the strain relief assembly 200 to the body 101.

Figure 4:
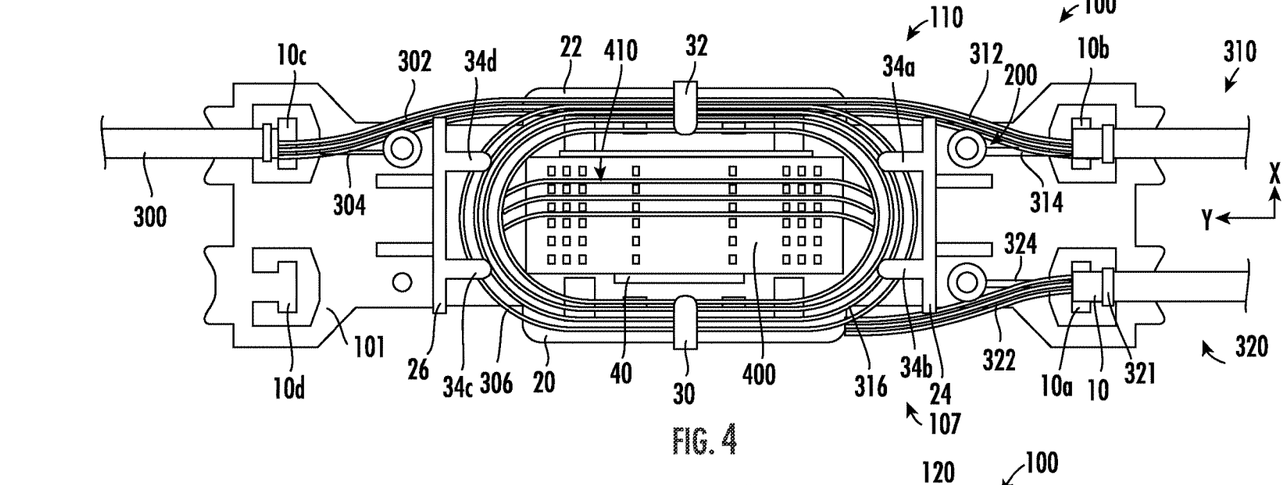
FIG. 4 schematically depicts a top view of the fiber routing tray of FIG. 1 assembled together with a spliced connection insert, according to one or more embodiments shown and described herein.
Figure 5:
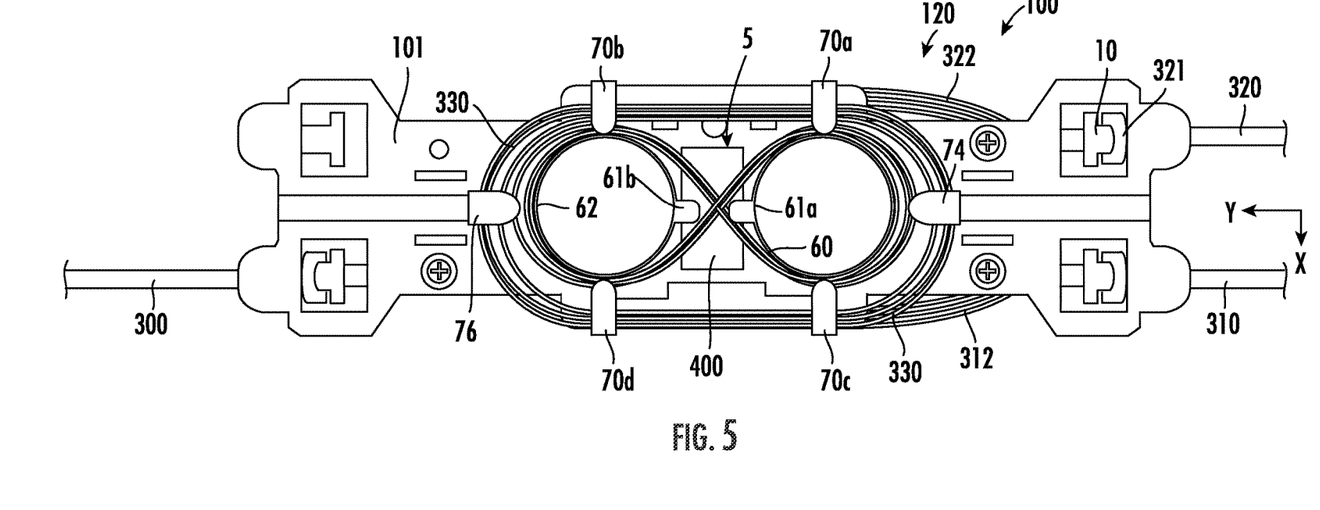
FIG. 5 schematically depicts a bottom view of the fiber routing tray of FIG. 1 assembled together with a spliced connection insert, according to one or more embodiments shown and described herein.

Referring now to FIGS. 4 and 5, the fiber routing tray 100 assembled with a spliced connection insert 400 is schematically depicted. The spliced connection insert 400 is received within the connector interface 5 of the fiber routing tray 100, so as to be recessed within the connector interface 5. However, it will be appreciated that in other embodiments the spliced connection insert 400 may be formed integrally with the body 101. The spliced connection insert 400 is generally configured to couple an express fiber cable 300 to one or more drop fiber cables 310, such as drop fiber cables 310a and 310b, via spliced connections. Accordingly, the spliced connection insert 400 generally includes a plurality of receiving channels 410 arranged along the connector side 110 of the body 101. The receiving channels 410 are each configured to receive and organize mated fibers of a spliced connection.

The express fiber cable 300 and the drop fiber cables 310 and 320 may each be attached to the one of the strain relief tabs 10 of the body 101. For example, as depicted, drop fiber cable 320 is attached to the strain relief tabs 10a via an attachment device 321. The attachment device 321 may be a zip-tie, clamp, string, tape, wire, or other appropriate attachment device. The attachment device 321 may encircle both the strain relief tab 10 and the drop fiber cable 320. In particular, the attachment device 321 may encircle the strain relief tab 10 at the recesses 11a and 11b, such that the attachment device 321 is substantially restrained from longitudinal sliding. The express fiber cable 300 and the drop fiber cable 310 may be attached to the body 101 in a substantially similar way at respective strain relief tabs 10c and 10b.

Referring still to the drop fiber cable 320 as an example, the drop fiber cable 320 may be separated into components, such as strength member 324 and one or more drop fiber component cables 322 extending longitudinally inward of the attachment device 321. The strength member 324 may be a plastic rod, such as fiberglass epoxy rod, though any other suitable material is contemplated and possible. For example, the strength member 324 may be made from aramid yarn, fiberglass epoxy rods, steel, or other suitable material. The strength member 324 may be secured within the strain relief assembly 200. Referring to FIGS. 3 and 4 in combination, the strength member 324 may be secured between the body 101 and the toothed washer 230. The strength member 324 may extend longitudinally between the standoffs 212 and 214. Accordingly, as the screw 240 is advanced within the threaded cap 250, the strain relief assembly 200 will tighten, thereby engaging the toothed washer 230 with the strength member 324, such that the teeth of the toothed washer 230 engage or "bite" into the strength member 324. As the strain relief assembly 200 is tightened by advancing the screw 240, a retention force exerted on the strength member 324 by the strain relief assembly 200 will increase. In this way, motion or longitudinal sliding of the strength member may be restricted. If, instead, the screw 240 is retracted from the threaded cap 250, then the strain relief assembly 200 will loosen, thereby releasing the strength member 324. When tightened, axial forces acting on the drop fiber cable 320 may be focused on the strength member, thereby reducing axial forces on the fibers or component cables of the drop fiber cable 320.

Similarly, the express fiber cable 300 and the drop fiber cable 310 may include strength members 304 and 314, respectively. The strength members 304 and 314 may be secured in strain relief assemblies 200 in the same manner as described hereinabove.

Referring to FIGS. 4 and 5 in combination, the express fiber cable 300 may include one or more express fiber component cables 302, and the drop fiber cable 310 may include one or more drop fiber component cables 312. Each of the express fiber component cable 302 and the drop fiber component cables 312 and 322 may be oriented to the outside of the dividing walls 24 and 25, as shown. From this orientation, the express fiber component cable 302 and the drop fiber component cables 312 and 322 may be arranged around either the connector side 110 or the slack storage side 120 of the body 101. For example, as depicted, the express fiber component cable 302 may be arranged on the connector side 110. The express fiber component cable 302 may be retained between the second exterior wall 22 and the interior wall 42 in the second fiber channel 23. The express fiber component cable 302 may be retained in place by the fiber channel tab 32.

Comparatively, a portion of the drop fiber component cables 312 and 322 may be arranged on the slack storage side 120. As depicted, a portion of the drop fiber component cables 312 and 322 may pass from the outside of the first dividing wall 24 to the slack storage side 120 at a transition location 107. The drop fiber component cables 312 and 322 may then be arranged about the slack winding walls 60 and 62 and beneath the one or more lateral wall retention tabs 74 and 76, the one or more longitudinal wall retention tabs 70, and the one or more slack retention tabs 61 and 63. In embodiments, the drop fiber component cables 312 and 322 may be arranged in a FIG. 8 orientation as shown. However, in other embodiments the arrangement of the drop fiber component cables 312 and 322 may be different. For example, in embodiments the drop fiber component cables 312 and 322 may be arranged in an ovular shape or other arrangement.

As shown, a portion of the drop fiber component cables 312 and 322 are arranged on the slack storage side 120, and the express fiber component cable 302 is not arranged on the slack storage side 120. However, as will be appreciated by those skilled in the art, in other embodiments the arrangements may be different. For example, in embodiments, the express fiber component cable 302 may also have a portion arranged on the slack storage side 120. Alternatively, in embodiments, no cables may be arranged on the slack storage side 120.

By arranging one or more fibers or cables, such as the drop fiber component cables 312 and 322 on the slack storage side 120, the slack of the drop fiber component cables 312 and 322 can be stored directly on the fiber routing tray 100. This may be beneficial in some applications such as where additional connections are later added, preventing strain on the spliced connection (or other connection type), and/or managing excess cable length.

Referring still to FIG. 4, the express fiber component cable 302 may be separated into express fibers 306 for splicing. Similarly, the drop fiber component cables 312 and 322 may be separated into drop fibers 316 for splicing. The express fibers 306 and the drop fibers 316 may be arranged about the connector side 110 of the body 101. In particular, the express fibers 306 and the drop fibers 316 may be arranged such that some or all of the express fibers 306 and the drop fibers 316 are retained beneath the one or more fiber channel tabs 30 and 32 and the one or more dividing wall tabs 34. Spliced connections between the drop fibers 316 and the express fibers 306 may be held within the spliced connection insert 400 as depicted.

Figure 6:
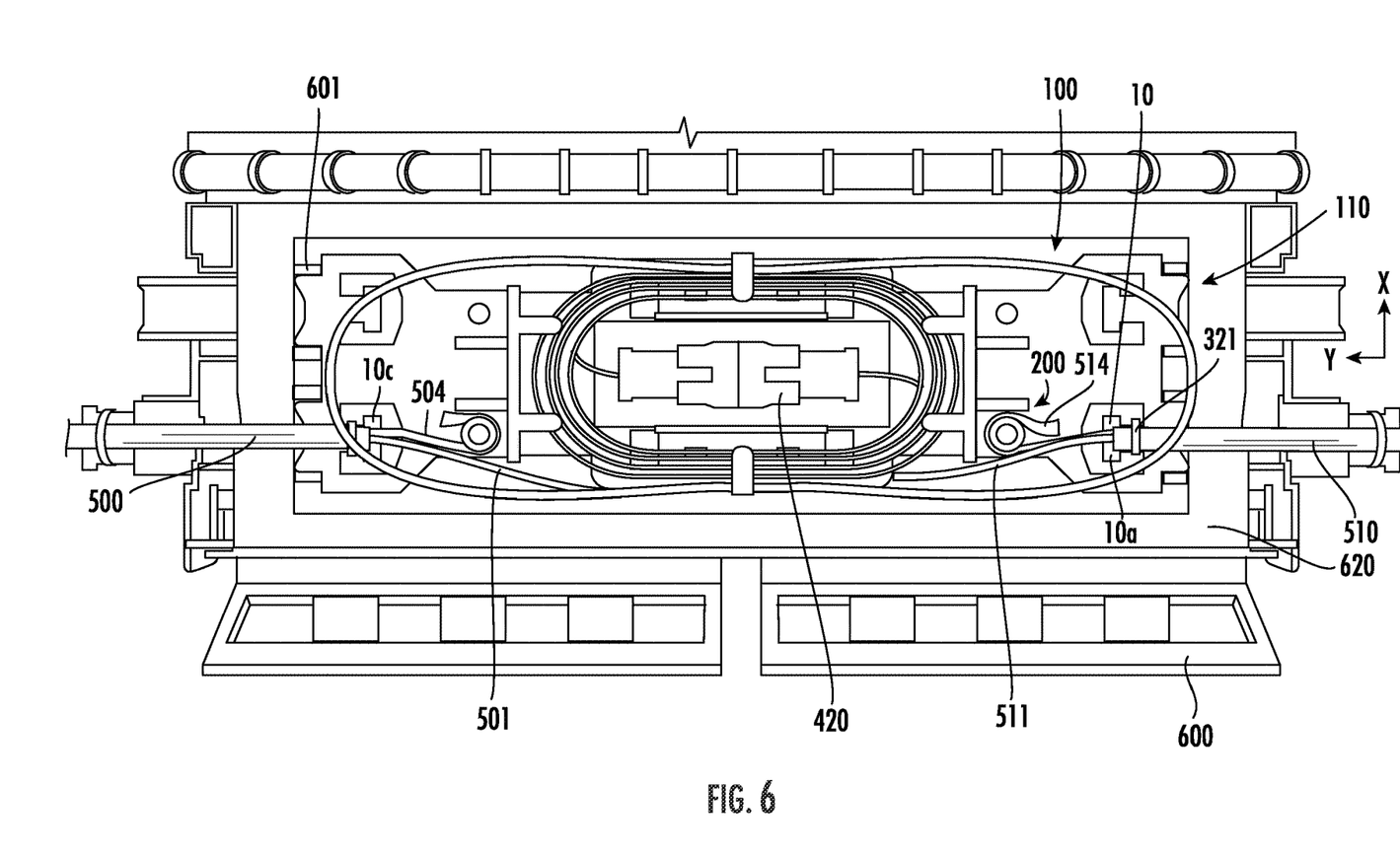
FIG. 6 schematically depicts a top view of the fiber routing tray of FIG. 1 assembled together with an SC insert and a fiber enclosure, according to one or more embodiments shown and described herein.

Referring now to FIG. 6, the fiber routing tray 100 assembled with an SC connection insert 420 is schematically depicted. The SC connection insert 420 is received within the connector interface 5 of the fiber routing tray 100, such as recessed therein. However, it will be appreciated that in other embodiments the SC connection insert 420 may be formed integrally with the body 101. The SC connection insert 420 is generally configured to couple a first cable 500 to a second cable 510 with an SC connection.

The first cable 500 and the second cable 510 may each be attached to the one or more strain relief tabs 10. As depicted, the first cable 500 and the second cable 510 may be attached to the strain relief tabs 10c and 10a, respectively, via an attachment device 321 as described hereinabove. Longitudinally inward of the attachment device 321, the second cable 510 may be divided into a component cable 511 and a strength member 514. Similarly, the first cable 500 may be divided into a component cable 501 and a strength member 504. In the present embodiment, the strength members 504 and 514 are made of aramid yarn; however, in other embodiments, the strength members 504 and 514 may be made of fiberglass epoxy rods, steel, or other suitable material. Referring to the second cable 510 as an example, the strength member 514 may be secured by the strain relief assembly 200, as described hereinabove. The strength member 504 may be retained in substantially the same way.

In embodiments and with reference to FIG. 6, the fiber routing tray 100 may be assembled into a fiber enclosure 600. Specifically, the fiber routing tray 100 may be placed within the fiber enclosure 600 and a lid of the fiber enclosure 600 may be closed (not shown in closed position), thereby enclosing the fiber routing tray 100. Referring briefly to FIGS. 1 and 2, the fiber routing tray 100 may include nesting tabs 111 disposed at the first end 102 and/or the second end 103. The nesting tabs 111 may extend downward (in the −Z direction of the depicted coordinate axes) from the body 101. The nesting tabs 111 may be configured to nest within a corresponding feature 601 of the fiber enclosure 600. The corresponding feature 601 may be a channel formed in the fiber enclosure 600 corresponding to a nesting tab of the fiber routing tray 100. Accordingly, the nesting tabs 111 may operate to orient the fiber routing tray 100 within the fiber enclosure 600. It is noted that while four nesting tabs 111 are depicted, a greater or few number of nesting tabs are contemplated and possible.

Still referring back to FIG. 6, the fiber routing tray 100 may be surrounded within the fiber enclosure 600 by a sealant 620. Sealant 620 may be a gel-type sealant or any other watertight sealant appropriate to protect the cable connection from damage. Sealant 620 may be injected into the fiber enclosure 600 while the lid 601 is in a closed position, thereby providing a water-tight seal when the fiber enclosure 600 is closed.

In view of the above, it should now be understood that at least some embodiments of the present disclosure are directed to a fiber routing tray that generally includes a body, a connector interface, and one or more strain relief assemblies. The body extends between a first end and a second end and defines a connector side and a slack storage side opposite the connector side. The connector interface may be arranged on the connector side of the body between the first end and the second end and is configured to connect one or more fibers. The one or more strain relief assemblies are coupled to the body and are configured to secure one or more strength members of a fiber optic cable to the body. The one or more strain relief assemblies may extend through the body and engage the connector side and the slack storage side of the body. As will be described in greater detail herein, the one or more strain relief assemblies may be movable between an engaged position and a released position, wherein the one or more strain relief assemblies are configured to engage the one or more strength members of the fiber optic cable in the engaged position thereby restricting motion of the strength member relative to the body. Accordingly, by restricting motion of the strength member relative to the body, axial tension may be concentrated on the strength member as opposed to the more delicate fibers.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of assembling a fiber optic connector comprising:
   securing a fiber optic cable against a connector side of a dual-sided connector tray at a strain relief tab;
   retaining a first fiber of the fiber optic cable against a slack storage side of the dual-sided connector tray, wherein the slack storage side is opposite the connector side; and
   connecting the first fiber to a second fiber at a connector interface arranged on the connector side.

2. The method of claim 1, wherein the securing the first fiber of the fiber optic cable against the slack storage side further comprises arranging the first fiber in a figure-8 orientation.

3. The method of claim 1, further comprising securing a strength member of the fiber optic cable within a strain relief assembly.

* * * * *